J. W. JEPSON.
ENGINE APPLIANCE.
APPLICATION FILED AUG. 5, 1912.
1,240,724. Patented Sept. 18, 1917.
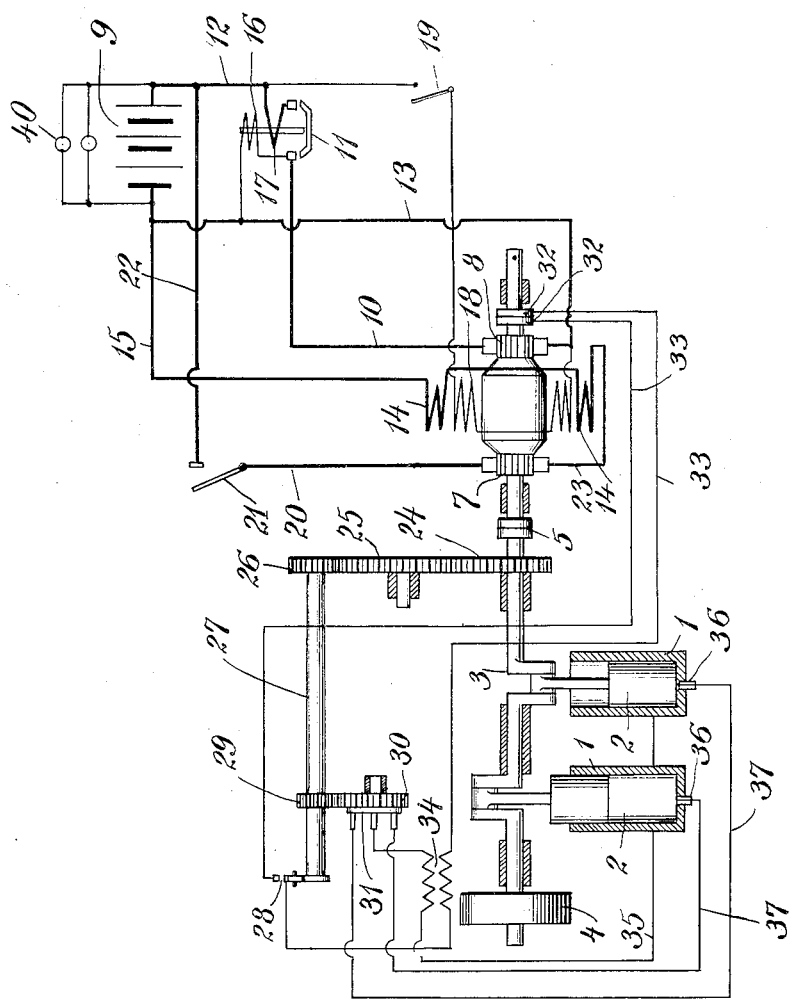
WITNESSES
INVENTOR
John W. Jepson
BY
Kenyon & Kenyon
ATTORNEYS

UNITED STATES PATENT OFFICE.

JOHN W. JEPSON, OF DEPEW, NEW YORK, ASSIGNOR TO GOULD COUPLER COMPANY, A CORPORATION OF NEW YORK.

ENGINE APPLIANCE.

1,240,724.    Specification of Letters Patent.    Patented Sept. 18, 1917.

Application filed August 5, 1912. Serial No. 713,272.

*To all whom it may concern:*

Be it known that I, JOHN W. JEPSON, a citizen of the United States, and a resident of Depew, county of Erie and State of New York, have invented certain new and useful Improvements in Engine Appliances, of which the following is a specification.

My invention relates to improvements in engine appliances and more particularly to an arrangement in which a dynamo electric apparatus is employed in connection with a gas engine and storage battery, whereby energy may be transmitted to the storage battery from the engine to charge the battery, and energy may be transmitted from the battery to start the engine.

One object of my invention is to provide an arrangement of this class in which the elements are more efficiently arranged with respect to one another and so that my improvements may be added to certain known gas engine arrangements without material alteration or change therein. Further objects, features and advantages will more clearly appear from the detailed description given below taken in connection with the accompanying drawing which shows diagrammatically a system embodying my improvements in one form.

Referring to the drawing 1—1 represent cylinders of an internal combustion engine of the gas engine type, provided with pistons 2—2 operating engine shaft 3, provided on one end with a fly wheel 4. Rigidly connected with the engine shaft 3 at 5, is a dynamo provided with two sets of armature windings connected respectively to commutators 7 and 8. The commutator 8 (when charging the battery) is adapted to be connected to a battery 9 by means of conductor 10, main switch 11, conductor 12 to the battery, and from the other side of the battery through conductor 13 to the other side of the commutator 8. The main switch 11 is operated in a well known manner by a shunt coil 16 and reverse series coil 17. The dynamo is provided with a shunt field 18 adapted to be connected across the mains by means of a hand switch 19. The armature connected to the commutator 7 is adapted to be connected in circuit to the battery by means of conductor 20, switch 21, conductor 22 to one side of the battery and from the other side of the battery through conductor 15, series coil 14 and conductor 23, to the other side of the commutator 7.

Secured to the shaft 3 is a gear 24 driving intermediate gear 25 which in turn drives gear 26 fixed upon the shaft 27. The shaft 27 operates at one end a timing device 28 of any well known sort, and also has secured to it a gear 29 driving a gear 30 which operates a distributer 31 of any suitable or well known kind.

The dynamo is provided with alternating current terminals, as slip rings 32, which are connected by means of conductors 33 in series with the timing device 28, and the primary of a transformer 34. One terminal of the secondary of the transformer 34 is grounded through conductor 35 while the other terminal of the secondary is connected with the distributer 31, the distributer being connected with suitable jump sparking devices 36 in the engine cylinders by means of conductors 37.

It will therefore be seen that the dynamo will supply alternating current for the sparking devices, both when the dynamo is being driven by the engine and by the battery. When the engine is driving the dynamo current is delivered to the battery and to any translating devices 40 which may be connected across the battery through the mains 10, 12 and 13, for the purpose of charging the battery and supplying the lamps, &c. When, however, the engine is stationary and it is desired to start the same the switch 21 is closed, whereupon the battery 9 supplies current to the armature connected to the commutator 7 and to the series field 14, whereupon the dynamo acts as a series motor to produce a much greater torque than it would if it were acting as a motor by the armature connected to commutator 8 and field 18. This torque is sufficient to start the engine without the insertion of reducing gears. In order that the torque produced may be amply sufficient to start the engine the armature windings connected to the commutator 7 are made much heavier and with fewer turns than those connected to commutator 8 in order to get a maximum torque for the size of the machine employed. After the engine has been started and reached sufficient speed so that it will run under its own power, the switch 21 is opened and when the speed is sufficient so that the voltage of the generator becomes great enough to close the main switch 11 the dynamo will act to charge the battery. With such a dynamo electric apparatus I am therefore enabled to connect the dynamo directly to the engine shaft as at 5, without the intervention of any reducing gears or gearing of any sort. It is important that the dynamo be connected directly to the engine shaft, as by so doing it is unnecessary to make any changes or modifications in the engine apparatus such as is commonly found in automobiles, when it is desired to apply my improvements thereto.

Although I have described my improvements in great detail and with respect to one particular embodiment thereof, nevertheless I do not desire to be limited to such details except as clearly pointed out in the appended claims since many changes and modifications may well be made without departing from the spirit and scope of my invention in its broader aspects.

Having fully and clearly described my improvements, what I claim as new and desire to secure by Letters Patent, is:

1. In a system of the class described, the combination of an internal combustion engine and its shaft, a dynamo having its moving element rigidly connected to said shaft, electric ignition devices for the engine, a distributer geared to said shaft and controlling the operation of said ignition devices, connections between said distributer and dynamo whereby the dynamo supplies alternating current to the distributer to energize the ignition devices, a storage battery, said dynamo having two armature windings, one adapted to produce greater torque than the other, the winding of greater torque having a field winding in series with it and a switch for disconnecting both from the battery, the other armature winding having a field in shunt thereto and an automatic switch for connecting both across the battery when the voltage produced by the last mentioned armature winding reaches a predetermined value, said distributer being connected to the last mentioned armature winding.

2. In a system of the class described, the combination of an internal combustion engine and its shaft, a dynamo having its moving element rigidly connected to said shaft, electric ignition devices for the engine, a distributer geared to said shaft and controlling the operation of said ignition devices, connections between said distributer and dynamo whereby the dynamo supplies alternating current to the distributer to energize the ignition devices, a storage battery and lamps connected in parallel across the dynamo, said dynamo having two sets of windings, one for causing the engine to be started by the dynamo when said windings are connected to the battery, and the other to cause the dynamo to charge the battery when the engine is running at sufficient speed and a switch automatically connecting the latter windings to the battery when the voltage produced by said windings has attained a certain value, said distributer being connected to said last mentioned dynamo windings.

In testimony whereof, I have signed my name to this specification, in the presence of two subscribing witnesses.

JOHN W. JEPSON.

Witnesses:
L. METZEN,
M. A. BRAUN.